Aug. 28, 1928.
C. W. KEUFFEL
1,682,528
ROTATING DISK PHOTOMETER
Original Filed Feb. 15, 1923
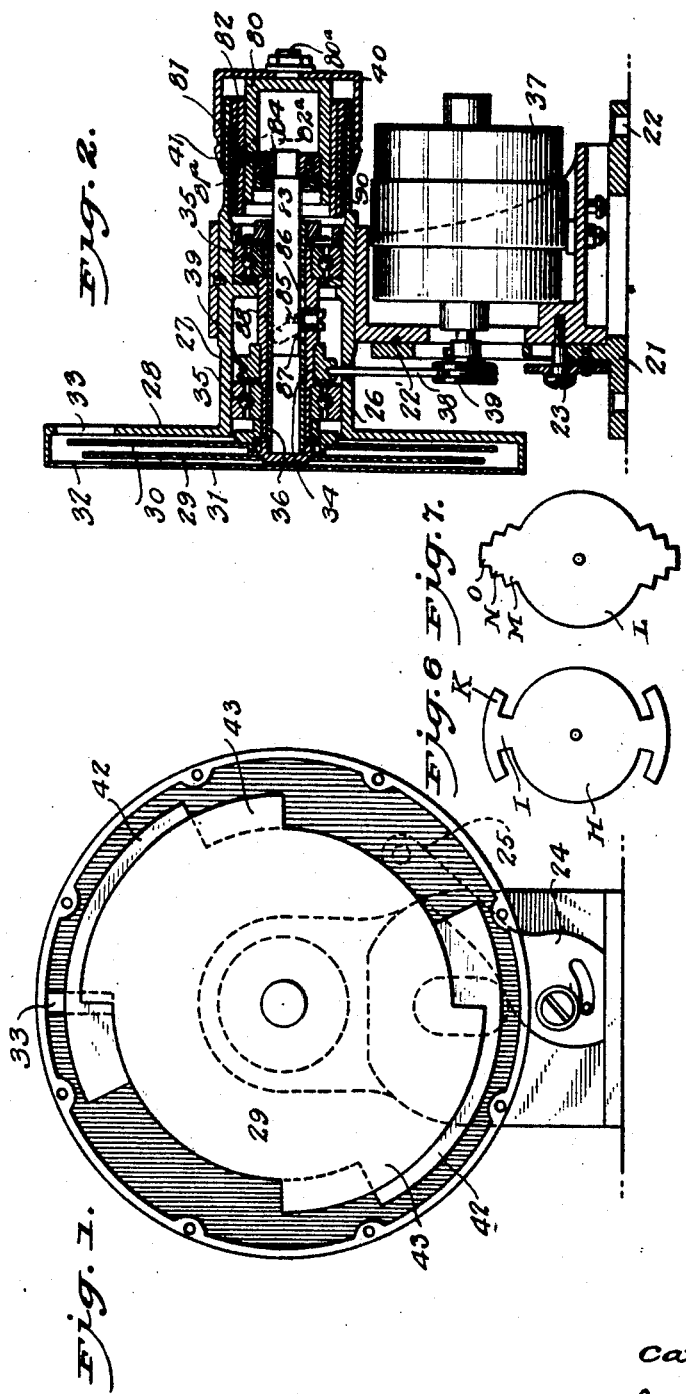
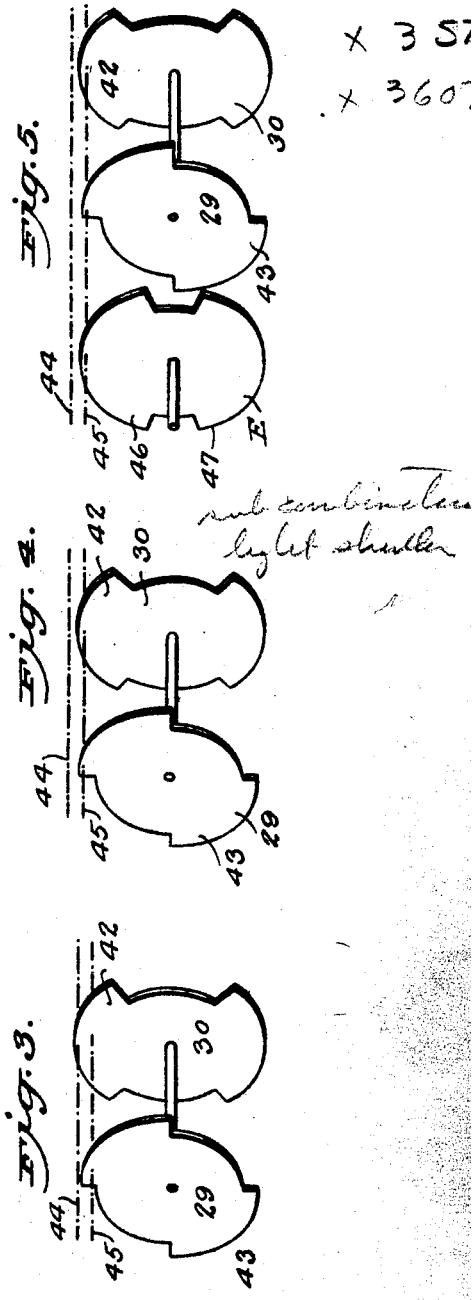
INVENTOR
Carl W. Keuffel
BY
George Cook & Son
ATTORNEYS Patented Aug. 28, 1928.

1,682,528

UNITED STATES PATENT OFFICE.

CARL W. KEUFFEL, OF WEEHAWKEN, NEW JERSEY, ASSIGNOR TO KEUFFEL AND ESSER COMPANY, OF HOBOKEN, NEW JERSEY, A CORPORATION OF NEW JERSEY.

ROTATING-DISK PHOTOMETER.

Original application filed February 15, 1923, Serial No. 619,168. Divided and this application filed January 2, 1924. Serial No. 683,996.

My invention relates to a rotary disk photometer and has for its object to provide an instrument of this character which will be particularly adapted for use in measuring the brightness of spectral colors.

In the analyzing of colors by the photometer-spectrometer method, such as described in my copending application filed February 15th, 1923 and bearing Serial Number 619,168 (of which the present application is a division), it is particularly important that a photometer be provided which will give accurate measurements for colors which occur in widely varying ranges of brightness.

This invention relates to photometers and particularly to the rotary disk type and has for its principal object to provide a new and improved construction by means of which the relative intensities of the beams of light under investigation may be quickly determined by a direct reading, obtained from a simple setting of a single manual control, the manipulation of which serves to vary the amount of light of the beams permitted to pass through the instrument.

Another object is to provide an instrument of this type with a pair of rotatable sectored disks relatively adjustable, while rotating, to different positions to cause the sectors of said discs to overlap to different extents and thereby intercept different amounts of the light of one of the beams relatively to the other.

A further object is to provide a simple and convenient means for adjusting the relative positions of the sectored discs and to combine with such means a scale, graduated to give by a direct reading the relative intensities of the beams under investigation.

Another object is to so construct a rotary disc photometer that while it will be adapted for the investigation and comparison of light beams of nearly equal intensities it may, by the manipulation of a single manual control, be immediately rendered especially adapted for the investigation of a beam of very low intensity relatively to the standard, and furthermore so that the scale reading for the device when so adjusted, will represent preferably a multiple of the true relative intensity of the beam under investigation is the standard, whereby beams of low intensity may be compared with a greater degree of accuracy than with the device set in its usual position.

These and other objects, such as the provision of a compact, strong and accurate instrument of neat and attractive appearance will appear more fully from the following more detailed description and by reference to the accompanying drawings forming a part hereof, wherein Figure 1 is a view in front elevation showing a constructional example of a novel rotating disk photometer embodying the principles of my invention, the front wall of the casing or housing being removed;

Figure 2 is a view in side elevation and partially in section thereof;

Figures 3 and 4 are diagrammatic views illustrating the manner in which the rotating sectored disks intercept the rays of light from the standard and from the sample;

Fig. 5 is a view similar to Figs. 3 and 4 showing the use of additional disks for the investigation of beams of low intensity; and Figures 6 and 7 are plan views of somewhat modified forms of sectored disks.

Referring specifically to the several views, wherein similar reference numerals designate corresponding parts throughout, my improved photometer as shown comprises a stand 21 upon which is slidably mounted a housing bracket 22' which is constrained for limited vertical movement by the screw 23, which latter also serves as a pivotal mounting for a cam lever 24, so that as the lever 24 is moved by the handle 25 the entire housing bracket will be raised or lowered for a purpose presently to be described.

A housing 26 is carried by the housing bracket and includes the tubular portion 27 which is flared at its outer extremity to provide a cup-shaped portion 28 in which the rotating sectored disks 29 and 30 are enclosed. A plate or cover 31 is preferably mounted upon the outer end of the flared portion 28 and is provided with an opening 32 aligning with a similar opening 33 in a housing so that beams of light from the sample and standard as hereinafter described may pass through the cover and flared portion of the housing. Rotatably mounted within the housing 26 is the main drive shaft 34 of tubular formation, supported by the ball bearings 35, and carrying at its outer extremity the disk 30. A tubular shaft 36 is contained within the drive shaft and supports at its outer extremity the disk 29, both the sleeve and main shaft being driven by the electric motor 37 through the intervention of the belt 38 and the pulleys 39, although any other suitable form of drive may be used.

The disks 29 and 30 are each provided with a pair of oppositely arranged sectors 42 and 43 respectively, each sector preferably extending through an arc of approximately 90°, as illustrated in Figure 1. Assuming that each sector extends through an arc of exactly 90° it will be readily understood that when the sectors of the two disks are in exact alignment and are rotated rapidly in the path of the beam, 50% of the light will be intercepted, while when the relative positions of the disks are changed until the sectors lie at right angles to each other, said sectors will in the latter position, form in effect a continuation of each other so that the entire beam will be intercepted. Adjustment of the disks between the exact alignment position and the right angle position of the sectors obviously will cut off the beam proportionately to the overlapping of the sectors, or in other words will permit an amount of light to pass the sectors proportionate to the effective angular opening between the sectors 42 and 43.

The sectors 42 of the inner disks extend radially beyond the sectors 43 of the outer disk as clearly shown in Figs. 1 and 2, and the two beams of light being compared are normally directed so that, as shown in Fig. 3, the outermost beam 44 will be intercepted only by the sectors 42 of the inner disk, while the inner beam 45 will be intercepted by both disks. Therefore the beam 44 will be intercepted a constant amount while the beam 45 will be intercepted an amount dependent on the angular positions of the sectors 42 and 43.

In order that the relative intensities of the two beams 44 and 45 coming respectively from a sample and a standard may be determined quickly and easily, I provide means for adjusting the relative angular positions of the disks without interrupting their rotation. A suitable construction for accomplishing such adjustment is shown in the drawings and consists in the provision of a cup-shaped, manually operable adjusting ring 40 which encloses the rear open end of the tubular housing 26. The ring 40 is rotatably mounted in the housing by means of a cup-shaped sleeve 80 which projects into a bushing 82 fixed within the bore of the housing 26, said ring 40 and sleeve 80 being secured together against movement relatively to each other by the stud and nut 80ª; in the constructional example illustrated the bushing 82 is shown as press-fitted within a sleeve 26ª screw threaded into the rear end of the housing 26.

Threaded into the sleeve 80 is a small headed screw 81, which projects radially from said sleeve and has mounted rotatably on it outer end an anti-friction roller 81ª, which engages within an angular cam slot 82ª formed in the bushing 82.

Mounted within the tubular shaft 36, which carries the disk 29, is a shaft 83 carrying a radially projecting headed screw 85 having mounted thereon an anti-friction roller 86.

The roller 86 engages within a longitudinally extending slot 87, formed in the tubular shaft 36, and also within an angularly disposed slot 88 formed in the main drive shaft 34, thus connecting the members 34, 36 and 83 and causing them to be rotated in unison by the rotation of the pulley 39. The rear end of the shaft 83 is rotatably mounted in the cup-shaped sleeve 80 by means of a ball bearing 84, secured to the shaft 83 and held against movement longitudinally of the sleeve 80 in a counterbore thereof by a collar 90 threaded into said counterbore.

It will be seen that the operating ring 40, sleeve 80 and shaft 83 are thus secured together for movement longitudinally of the housing 26, but that the shaft 83, tubular sleeve 36 and main shaft 34 are rotatable in unison with respect to the housing 26, ring 40 and sleeve 80. Rotation of the operating ring 40 will, through the co-action of the cam slot 82ª, cause the shaft 83 to be moved longitudinally of the housing, and, through the pressure of the roller 86 on the cam slot 88, produce an angular displacement of the tubular shaft 36 and main shaft 34, thus changing the relative positions of the disks 29 and 30. It will be understood that the cup-shaped sleeve 80 engages within the bushing 82 with just sufficient frictional presure to prevent the engagement of the roller 87 and cam 88 from causing relative angular displacement of the tubular shaft 36 and main shaft 34, while said parts are rotating, but permitting the operating ring and connected parts to be moved for adjusting the relative positions of the shafts and the disks carried thereby.

The operating ring and housing may be provided one with a pointer and the other with a scale graduated to correspond with the adjustment of the disks effected by the setting of the ring, the graduations of such scale preferably being selected and arranged to indicate directly the amount of the beam 45 not intercepted relatively to the beam 44. If the length of the sectors are exactly equal to a 90° arc, the graduations will be from 0 to 100, although it will be understood that the range of relative apparent intensities secured may be increased by increasing the length of the sectors 42 relatively to the sectors 43.

For the investigation of beams of very low intensity the housing 26 is held in the lowered position shown in Figs. 1 and 2 which corresponds with the diagrammatic showing of Fig. 4, while for beams of more nearly equal intensity the handle 25 is moved downwardly to bring the flat face 24ª out of engagement with the base 21 and to cause the curved cam face 24ᵇ to move the housing upwardly, thus bringing the disk sectors into the position shown diagrammatically in Fig. 3.

The lowered position of the disks as illustrated in Figure 4 causes the upper beam 44 to entirely clear, and the lower beam 45 to be intercepted by the sectors of both disks, so that when the apparent intensities of the two beams are the same, the scale reading must be divided by two, as the scale 41 will read 100 when the beam 44 is one-half the intensity of the standard 45.

Thus for measuring the intensity of colors or lights of less than one-half the intensity of the standard, the lowered position of the disk will be used and the precision and accuracy of the readings or measurements will accordingly be doubled, this being of particular importance in measuring colors of the spectrum of relatively low intensity.

Still greater precision in measuring lights or colors of relatively low intensity is obtained by using the auxiliary motor-driven disk E and so arranging the same that it intercepts the beam 45 from the standard and reduces the same a fixed or predetermined amount. This is diagrammatically illustrated in Figure 5, wherein the auxiliary disk 46 is provided with the sectors 47 adapted to intercept 90% of the standard beam 45 and in which instance the scale reading should be divided by 20, that is to say, a large scale reading will be obtained for a relatively low intensity of beam 44 from the sample. Auxiliary disks having any desired angular opening between the sectors may be provided, and, furthermore, this auxiliary disk may be used to check the reading of the photometric scale by providing two beams of equal intensity and interposing in one of the beams an auxiliary disk having a fixed and known angular opening.

In Figure 6 I have illustrated a somewhat different or modified form of disk to be used when the photometer is held in fixed position, the disk in this figure being composed of a central or body portion H from which project the sectors I, and which in turn carry the sectors K. This disk is to be used in conjunction with a second disk having a single set of sectors corresponding with the sectors I and angularly adjustable therewith, similar to the sectored disks 29 and 30. With the beam from the standard intercepted by the sector K and from the sample intercepted by the sector I and a similar sector of a second disk (not shown) then the 0 and 100 mark on the photometer scale will indicate an intensity of beam in accordance with the relation between the angular extent of the sectors I and K. For example, with each sector I extending through an arc of 45° and each sector K through an arc of 60°, then with the sector of the second disk (not shown) in alignment with the sector I, and the apparent intensity of the beams the same, the 0 mark will correspond to a sample having 75% intensity, and with the sectors of the second disk out of alignment with the similar sectors I of the disk H and the apparent intensity of the beams the same, the 100 mark will correspond to a relative intensity of 150%; and, in like manner, I may provide disks having sectors of any desired and fixed relation.

A somewhat further modified form of sectored disk is disclosed in Figure 7, wherein the disk L carries thereon several sectors M, N and O, extending outwardly from the center of the disk and so arranged that the shifting of the disk with relation to the beam will cause the beam from the standard to be always intercepted by the sectors M, while that of the sample will be intercepted by one of the sectors M, N or O, and the scale reading will be modified accordingly. This disk L is also to be used in connection with a second disk having a single sector and which always intercepts the beam from the standard and in like manner various other combinations of sectored disks may be provided.

Having thus described and explained my invention, I claim and desire to secure by Letters Patent:

1. A photometer comprising two rotatable disks one located in front of the other and each provided with sectors having fixed angular openings therebetween, means for adjusting and indicating the relative angular position of the sectors of the two disks while in motion, the sectors of one disk extending radially beyond, and adapted to intercept rays of light not intercepted by, the sectors of the other disk, and means for shifting the axes of the disks.

2. A pair of sectors for a rotating disk photometer, one of said sectors varying in angular extent at various distances from its axis of rotation.

3. A pair of sectors for a rotating disk photometer, one of the sectors increasing or decreasing in angular extent, in definite steps, in a radial direction.

4. In a photometer, a pair of sectored disks arranged one in front of the other, means to rotate said disks in unison a manually adjustable controlling member, and connections therefrom to one of said disks for varying the relative positions of said disks while they are rotating.

5. In a photometer, a pair of disks arranged one in front of the other to intercept a beam of light, each of said disks being provided with a cut-out portion to permit the passage of a portion of said beam, driving mechanism for rotating said disks in unison and devices, operative during the rotation of said disks, for changing the relative angular positions of said disks and the cut-out portions thereof to vary the amount of light permitted to pass said disks.

6. In a photometer, a pair of disks and a common rotating means therefor, each of said disks having a cut-out portion for permitting the passage of a portion of a beam of light through which said discs are rotated, and a manually operable controlling member, operative during the rotation of said disks, for changing the relative positions of said disks thereby to vary the relative angular positions of said cut-out portions thereof.

7. In a photometer, a pair of nested shafts, a sectored disk mounted on each of said shafts, connections between said shafts for normally preventing relative angular movement of said shafts while permitting angular adjustment thereof and driving means for rotating said shafts in unison.

8. In a photometer, a pair of nested shafts, a sectored disk mounted on each of said shafts, a third shaft mounted within said shafts and movable longitudinally of said pair of shafts, driving means for rotating one of said shafts and connecting means between said shafts to cause them normally to rotate in unison, one of said pair of shafts being provided with a cam slot co-operating with said connecting means and constructed and arranged to cause relative angular displacement of said pair of shafts when said third shaft is moved longitudinally.

9. In a photometer, a housing, a pair of nested shafts mounted for rotation in said housing, means for driving said shafts, a third shaft, arranged in nested engagement with said pair of shafts for rotation therewith and for movement longitudinally of said housing, a manually operable adjusting ring rotatably mounted on said housing, said housing and ring being provided with co-operating means for causing longitudinal movement of said ring when it is rotated, connections between said ring and third shaft to cause said shaft to move longitudinally with said ring while permitting rotation of said shaft, and connections between said third shaft and said pair of shafts normally to cause said shafts to be rotated in unison by said driving means while permitting longitudinal movement of said third shaft by said ring.

10. In a photometer, a housing, a pair of nested shafts mounted for rotating in said housing, means for driving said shafts, a third shaft arranged in nested engagement with said pair of shafts for rotation therewith and for movement longitudinally of said housing, a manually operable adjusting ring rotatably mounted on said housing, said housing and ring being provided with co-operating means for causing longitudinal movement of said ring when it is rotated, connections between said ring and third shaft to cause said shaft to move longitudinally with said ring while permitting rotation of said shaft, and connections between said third shaft and said pair of shafts normally to cause said shafts to be rotated in unison by said driving means while permitting longitudinal movement of said third shaft by said ring, said last named connections including a cam to cause said longitudinal movement to produce relative angular displacement between the members of said pair of shafts.

11. A rotating disk photometer comprising two rotatable sectors, one located in front of the other, and both of said sectors being located in the path of one of a pair of adjacent beams of light, one of said sectors extending radially beyond the other, said sectors being mounted upon axes which are movable relatively to said beams to either of two positions, in one of which positions the other of said beams is unintercepted by said sectors and in the other of which positions said other beam is intercepted only by the radially extending sector, and means for shifting the axes of said sectors.

12. A photometer comprising rotatable sectors arranged one in front of the other and adapted to be adjusted to different overlapping positions, means for varying and simultaneously indicating the arc of a circle formed by the overlapping sectors, one of said sectors being provided with a portion extending radially beyond the other sector, said radially extending portion being adapted to intercept but one of two spaced beams of light, while the other of said beams is intercepted by both of said sectors, said radially extending portion of said one sector being constructed to intercept a predetermined definite proportion of said one beam relatively to the other beam, and the varying of overlap of said sectors affecting the amount of light intercepted of the other of said beams only.

13. A photometer comprising rotatable sectors arranged one in front of the other, and adapted to be adjusted to different overlapping positions, means for varying and simultaneously indicating the arc of a circle formed by the overlapping sectors, said sectors having a plurality of different segmental portions located at different distances radially of the axes of said sectors, each of said portions bearing a definite predetermined relationship to the others, so as to intercept different but proportional amounts of light of two spaced beams of light, and said sectors being mounted for bodily movement transversely of said beams so that upon relative shifting of the beams of light with relation to the sectors, or the sectors with relation to the beams, the amount of light of said beams intercepted by said sectors will be varied in definite predetermined proportions.

14. A photometer comprising two overlapping rotatable sectors one of which extends radially beyond the other, means for varying and simultaneously indicating the extent of the angle defined by the two overlapping sectors, the radially extending portion of said one sector being adapted to intercept but one of two spaced beams of light while the other of said beams of light is intercepted by both sectors, a manually operable device for producing relative movement between said beams of light and said sectors for causing said radially extending portion to be moved into or out of the path of said one beam, and said indicating means being designed to indicate directly a proportional amount of light intercepted by the overlapping sectors, and said radially extending portion bearing a definite predetermined relationship to unity so that when said portion intercepts said one beam the scale reading of the indicating means is modified in accordance with said definite proportion of unity.

15. In a photometer, a pair of shafts arranged in axial alignment, a pair of sectored disks, one secured to each of said shafts and arranged in closely spaced relationship one in front of the other, means connecting said shafts to cause them normally to rotate in unison but permitting them to be moved relatively to each other to cause said sectored disks to be moved to different adjusted angular positions, and a manually operatable member operatively associated with said shafts for changing the angular adjustment of said sectors, said member being movable during the rotation of said shafts.

Signed at Hoboken, in the county of Hudson and State of New Jersey, this 27th day of December A. D. 1923.

CARL W. KEUFFEL.